US012128473B2

(12) United States Patent
Savoy et al.

(10) Patent No.: US 12,128,473 B2
(45) Date of Patent: Oct. 29, 2024

(54) APPARATUS AND METHOD FOR SECURING A CLINCH NUT TO A SHEET OF ADVANCED HIGH STRENGTH STEEL

(71) Applicant: UTICA ENTERPRISES, INC., Troy, MI (US)

(72) Inventors: Mark A. Savoy, Warren, MI (US); Phillip J. I. Morgan, Royal Oak, MI (US)

(73) Assignee: Utica Enterprises, Inc., Troy, MI (US)

( * ) Notice: Subject to any disclaimer, the term of this patent is extended or adjusted under 35 U.S.C. 154(b) by 761 days.

(21) Appl. No.: 15/910,599

(22) Filed: Mar. 2, 2018

(65) Prior Publication Data

US 2018/0250734 A1    Sep. 6, 2018

Related U.S. Application Data

(60) Provisional application No. 62/466,489, filed on Mar. 3, 2017.

(51) Int. Cl.
*B21J 15/08*    (2006.01)
*B21D 39/03*    (2006.01)
(Continued)

(52) U.S. Cl.
CPC .......... *B21J 15/08* (2013.01); *B21D 39/031* (2013.01); *B21J 15/28* (2013.01);
(Continued)

(58) Field of Classification Search
CPC ......... B21J 15/08; B21J 15/28; B21D 39/031; B23K 26/0853
See application file for complete search history.

(56) References Cited

U.S. PATENT DOCUMENTS 3,213,914 A    10/1965    Baumle et al.
4,237,363 A    12/1980    Lemelson
(Continued)

FOREIGN PATENT DOCUMENTS

CN    1976777 A    6/2007
CN    101469733 A    7/2009
(Continued)

OTHER PUBLICATIONS

PCT International Search Report and Written Opinion Dated Jul. 19, 2018, Application No. PCT/US18/20654, Applicant Utica Enterprises, Inc., 11 Pages.
(Continued)

*Primary Examiner* — Nathaniel E Wiehe
*Assistant Examiner* — Alba T Rosario-Aponte
(74) *Attorney, Agent, or Firm* — Brooks Kushman P.C.

(57) ABSTRACT

Apparatus (20) and a method for securing a clinch nut (24) to an AHSS sheet (26) as an assembly (22). In one embodiment, a parallel kinematic machine (PKM) (88) sequentially performs the operation, while another embodiment includes a nut ram assembly (112) that attaches clinch nuts (24) to the AHSS sheet (26), and a further embodiment includes a C frame (114) that supports the apparatus and is moved by a robot (130) to sequentially attach clinch nuts (24) to the AHSS sheet (26) at different locations. The attachment of the clinch nuts is performed in a manner that contains laser beam radiation.

20 Claims, 9 Drawing Sheets

(51) Int. Cl.
  *B21J 15/28* (2006.01)
  *B23K 26/08* (2014.01)
  *B23P 19/06* (2006.01)
  *F16B 37/06* (2006.01)
(52) U.S. Cl.
  CPC ........ *B23K 26/0853* (2013.01); *B23P 19/064* (2013.01); *F16B 37/068* (2013.01)

(56) References Cited

U.S. PATENT DOCUMENTS

| | | | |
|---|---|---|---|
| 4,564,986 | A | 1/1986 | Peterson |
| 5,356,255 | A | 10/1994 | Takahashi et al. |
| 5,752,305 | A | 5/1998 | Cotterill et al. |
| 5,882,159 | A | 3/1999 | Müller |
| 6,417,490 | B1 | 7/2002 | Liebrecht et al. |
| 6,439,819 | B2 | 8/2002 | Swanstrom et al. |
| 6,446,478 | B1 * | 9/2002 | Muller ............... B21D 39/021 72/306 |
| 6,684,479 | B2 | 2/2004 | Wang et al. |
| 6,742,235 | B2 | 6/2004 | Blacket et al. |
| 6,769,595 | B2 | 8/2004 | Stol et al. |
| 6,836,948 | B2 | 1/2005 | Wang |
| 6,962,469 | B2 | 11/2005 | Wang et al. |
| 7,267,736 | B2 | 9/2007 | Hou et al. |
| 7,740,436 | B2 | 6/2010 | Pamer |
| 8,234,770 | B2 | 8/2012 | Durandet et al. |
| 8,283,601 | B2 | 10/2012 | Jin |
| 8,365,376 | B2 | 2/2013 | Reid et al. |
| 8,898,880 | B2 | 12/2014 | Trinick |
| 9,259,774 | B2 | 2/2016 | Carter |
| 10,406,592 | B2 | 9/2019 | Blacket et al. |
| 2003/0167621 | A1 | 9/2003 | Wang et al. |
| 2004/0086355 | A1 | 5/2004 | Couillais et al. |
| 2004/0134968 | A1 * | 7/2004 | Opper ............... B21J 15/025 228/103 |
| 2005/0111911 | A1 * | 5/2005 | Zdravkovic ........ B23P 19/062 403/283 |
| 2007/0137476 | A1 * | 6/2007 | Neumann ............ F16C 11/06 91/506 |
| 2007/0224017 | A1 | 9/2007 | Pamer |
| 2007/0258788 | A1 | 11/2007 | Gardstam |
| 2008/0085368 | A1 * | 4/2008 | Gauthier ........... B23K 26/0876 427/314 |
| 2009/0188101 | A1 * | 7/2009 | Durandet ............ B21J 15/08 29/525.01 |
| 2010/0122444 | A1 * | 5/2010 | Reid ................. B21J 15/142 29/243.54 |
| 2010/0209210 | A1 | 8/2010 | Kovac et al. |
| 2011/0173803 | A1 * | 7/2011 | Naito ................ B21J 15/025 29/798 |
| 2011/0277288 | A1 * | 11/2011 | Wendt ............... B21J 15/02 29/243.53 |
| 2012/0103946 | A1 | 5/2012 | Krink et al. |
| 2012/0124812 | A1 | 5/2012 | Shinjo |
| 2012/0223059 | A1 * | 9/2012 | Ackelid .............. B22F 3/1055 219/121.17 |
| 2012/0315109 | A1 | 12/2012 | Golovashchenko |
| 2014/0353293 | A1 * | 12/2014 | Huonker ............ B23K 26/037 219/121.6 |
| 2016/0325341 | A1 * | 11/2016 | Gostylla ............. B21J 15/025 |
| 2017/0234353 | A1 * | 8/2017 | Lewis ............... F16B 37/065 411/1 |
| 2018/0169962 | A1 | 6/2018 | Shriver et al. |
| 2018/0185902 | A1 | 7/2018 | Furusako et al. |
| 2018/0185903 | A1 | 7/2018 | Furusako et al. |
| 2018/0185904 | A1 | 7/2018 | Jang et al. |
| 2018/0272417 | A1 * | 9/2018 | Iwase ................ F16B 19/06 |

FOREIGN PATENT DOCUMENTS

| | | |
|---|---|---|
| CN | 201275576 Y | 7/2009 |
| CN | 102003448 A | 4/2011 |
| CN | 102672062 A | 9/2012 |
| CN | 202746914 U | 2/2013 |
| CN | 103658416 A | 3/2014 |
| CN | 20597792 U | 2/2017 |
| CN | 110382133 B | 1/2022 |
| DE | 19630488 C2 | 7/1999 |
| DE | 19800035 A1 | 7/1999 |
| DE | 20013526 U1 | 12/2000 |
| DE | 102004062896 A1 | 5/2006 |
| DE | 112007001331 T5 | 7/2009 |
| EP | 0744232 B1 | 6/2003 |
| EP | 2543451 A1 | 1/2013 |
| EP | 3411178 | 10/2017 |
| JP | S62105736 U | 7/1987 |
| JP | S62179882 A | 8/1987 |
| JP | H08318339 A | 12/1996 |
| JP | 2000511470 A | 9/2000 |
| JP | 2005342729 A | 12/2005 |
| JP | 2006007266 A | 1/2006 |
| JP | 2006043769 A | 2/2006 |
| JP | 2009538738 A | 11/2009 |
| JP | 2010525174 A | 7/2010 |
| JP | 2012112402 A | 6/2012 |
| JP | 2012179646 A | 9/2012 |
| JP | 2014092224 A | 5/2014 |
| KR | 1020100120115 A | 11/2010 |
| KR | 1020140125872 A | 12/2014 |
| KR | 101543244 B1 | 8/2015 |
| KR | 1020160106129 A | 9/2016 |
| WO | 2007137367 A1 | 12/2007 |
| WO | 2010012973 A1 | 2/2010 |
| WO | 2020093143 A1 | 5/2020 |

OTHER PUBLICATIONS

Chinese Office Action for Application No. 201880015728.8, dated Jun. 29, 2020, 7 pages.
PCT Invitation to Pay Additional Fees and, Where Applicable, Protest Fee, Dated May 18, 2018, Application No. PCT/US18/20654, Applicant Utica Enterprises, Inc., 2 Pages.
International Preliminary Report for Application No. PCT/US2018/020654, dated Oct. 22, 2019, 15 pages.
Indian First Examination Report for Application No. 201937037868, dated May 5, 2021, 6 pages.
European Search Report and Written Opinion for Application No. 18760741.1, dated Dec. 16, 2020, 8 pages.
Chinese Office Action and English translation for Application No. 201880015728.8, dated Feb. 18, 2021, 11 pages.
Japanese Office Action for Application No. 2019-543302, dated Mar. 1, 2022, 12 pages.
Brazil Examination Report for Application No. BR112019018170-9, dated Jul. 4, 2022, 4 pages.
Brazil Office Action for Application No. 1120190181709, dated Feb. 6, 2023, 8 pages.
European Search Report for Application No. 18 760 741.1-1103, dated Mar. 10, 2023, 4 pages.
Korea Office Action for Application No. 10-2019-7026688, dated Jan. 25, 2023, 30 pages.
U.S. Office Action for U.S. Appl. No. 18/357,480, dated Nov. 24, 2023, 8 pages.
Europe Office Action for Application No. 18760741.1, dated Oct. 19, 2023, 6 pages.
Mexico Office Action with English translation for Application No. MX/a/2019/010285, dated Jul. 26, 2023, 7 pages.
Mexican Office Action for Application No. MX/a/2019/010285, dated Apr. 14, 2023, 6 pages.
U.S. Final Office Action for U.S. Appl. No. 18/357,480, dated Mar. 21, 2024, 11 pages.
Canada Examination Report for Application No. 3,052,671, dated Dec. 20, 2023, 4 pages.

* cited by examiner

APPARATUS AND METHOD FOR SECURING A CLINCH NUT TO A SHEET OF ADVANCED HIGH STRENGTH STEEL

CROSS-REFERENCE TO RELATED APPLICATIONS

This application claims the benefit of U.S. provisional application Ser. No. 62/466,489 filed Mar. 3, 2017, the entire disclosure of which is hereby incorporated by reference.

TECHNICAL FIELD

This invention relates to an apparatus and a method for securing a clinch nut to a sheet of advanced high strength steel and also relates to the resultant assembly of the advanced high strength steel sheet and the attachment of a pierce clinch nut.

BACKGROUND

As disclosed by U.S. Pat. No. 8,234,770 Durandet et al., lasers have previously been used for mechanically joining aluminum and/or magnesium elements using self-piercing rivets with preheating.

Use of lasers for heating in metallic joining processing must be carried out in a light-safe manner so that no scattered radiation from an intense laser beam causes damage to an operator. Previously such processing has been performed in a processing station that is secured against operator access during use so there is no exposure of operators to the laser beams.

SUMMARY

An object of the present invention is to provide improved apparatus for securing a clinch nut to a sheet of advanced high strength steel (hereinafter also referred to as AHSS).

In carrying out the above object, the apparatus includes a joining assembly adjacent which the AHSS sheet is positioned and which includes a base and an indexing member mounted on the base for movement parallel to the AHSS sheet, and the indexing member has a heating opening and a clinch die spaced from each other along a direction parallel to the AHSS sheet. An actuator moves the indexing member between a heating position where its heating opening is located at a work location of the AHSS sheet and a joining position where its clinch die is located at the work location of the AHSS sheet. A laser assembly fires a laser beam through the heating opening of the indexing member while in the heating position to provide heating of the work location of the AHSS sheet. The apparatus also includes a nut ram to which clinch nuts, each of which has a threaded hole, are fed and the nut ram being aligned with the clinch die when the indexing member is in the joining position to attach a clinch nut to the AHSS sheet at the heated work location of the AHSS sheet so a threaded fastener can be connected to the AHSS sheet. A controller of the apparatus is configured to operate the joining assembly and the nut ram.

As disclosed, the joining assembly includes an enclosure defining a light-safe chamber wherein the laser assembly is located. The laser assembly fires a laser beam through a hole in the base of the enclosure and thence through the heating opening in the indexing member while the indexing member is in the heating position to provide the heating of the work location of the AHSS sheet. A detector assembly of the apparatus is operated by the controller to only permit operation of the laser assembly when the AHSS sheet is in light-safe contact with the indexing member around its heating opening when the indexing member is positioned in its heating position. The detector assembly includes a source of pressurized gas for providing pressurized gas to the chamber and also includes a detector for detecting gas flow from the source through the chamber to detect whether the AHSS sheet is in light-safe contact with the indexing member around its heating opening.

The apparatus may feed pierce clinch nuts to the nut ram for attaching to the AHSS sheet.

The joining assembly disclosed may include either: a slideway that mounts the indexing member on the base of the enclosure for rectilinear movement by an actuator between the heating position and the joining position; or a pivotal connection that mounts the indexing member on the base of the enclosure for pivotal movement by an actuator between the heating position and the joining position.

The apparatus also disclosed a temperature sensor for sensing the temperature of the AHSS sheet at the work location of the AHSS sheet from above or below the sheet.

One embodiment of the apparatus includes a plurality of the joining assemblies spaced from each other and operated by the controller; and a parallel kinematic machine (PKM) operated by the controller and including: a first support; a tripod having three extendable and retractable struts mounted and extending away from the first support in a converging manner toward each other; a second support mounted by the three struts spaced from the first support to mount the nut ram that aligns with the clinch die under the operation of the controller to provide the attachment of clinch nuts to the AHSS sheet; and perpendicular rails that mount the PKM for movement in horizontal directions that are perpendicular to each other to cooperate with the joining assemblies to provide attachment of clinch nuts to the AHSS sheet at different locations.

Another embodiment of the apparatus includes a floor and a framework having an upper beam spaced above the floor, and the joining assembly and nut ram are located and operated between the floor and upper beam of the framework. As disclosed, the embodiment of the joining assembly is supported on the floor below the AHSS sheet and the nut ram is supported by the upper beam of the framework above the AHSS sheet. This embodiment may also include a plurality of the joining assemblies mounted on the floor spaced from each other and operated by the controller as well as including a nut ram assembly that mounts a plurality of the nut rams under the operation of the controller to cooperate with the joining assemblies to provide attachments of the clinch nuts to the AHSS sheet at different locations.

A further embodiment of the apparatus includes a C frame having one end that supports the joining assembly and having another end that supports the nut ram assembly that cooperates with the clinch die under the operation of the controller to provide the attachment of the clinch nuts to the AHSS sheet, and a robot that moves the C frame under operation of the controller to simultaneously provide the attachments of the clinch nuts to the AHSS sheet at different locations.

Another object of the invention is to provide an improved method for securing a clinch nut to a sheet of AHSS.

In carrying out the immediately preceding object, the method is performed by positioning an AHSS sheet adjacent a joining assembly including an indexing member movable parallel to the AHSS sheet and having a heating opening and a clinch die spaced from each other along a direction parallel to the AHSS sheet. A laser beam is fired through the heating opening of the indexing member at a heating position thereof to heat a work location of the AHSS sheet, and the indexing member is then moved parallel to the AHSS sheet to a joining position where its clinch die is aligned with the work location of the AHSS sheet. A controller operates a nut ram to which clinch nuts, each of which has a threaded opening, are fed to cooperate with the clinch die when the indexing member is in the joining position to attach a clinch nut to the AHSS sheet at its work location so a threaded fastener can be connected to the AHSS sheet.

As disclosed, the laser beam is fired from within a light-safe chamber through an opening in a chamber and thence through the heating opening of the indexing member while in the heating position to provide the heating of the work location of the AHSS sheet. The laser beam firing is only permitted by the controller when presence of the AHSS sheet is detected closing the heating opening of the indexing member around its heating opening with a light-safe contact.

The disclosed method senses pressurized gas flow through the light-safe chamber is sensed to detect whether the AHSS sheet is contacting the indexing member to a light-safe extent around its heating opening to control operation of the laser beam by the controller, and pierce clinch nuts are fed to the nut ram.

In one mode of operation, the indexing member is moved in a rectilinear manner between the heating position and the joining position, and in another mode of operation, the indexing member is pivotally moved between the heating position and the joining position.

The method is also disclosed as sensing the temperature of the AHSS sheet at its work location from above or below the AHSS sheet.

In one practice of the method, the controller operates a plurality of the joining assemblies spaced from each other and also operates a parallel kinematic machine (PKM) wherein each joining assembly includes: a first support; a tripod having three extendable and retractable struts mounted and extending away from the first support in a converging manner toward each other; and a second support mounted by the three struts spaced from the first support to mount the nut ram that cooperates with the clinch die under the operation of the controller to provide attachment of the clinch nuts to the AHSS sheet; and wherein perpendicular rails mount the PKM for movement under its operation of the controller in horizontal directions that are perpendicular to each other to cooperate with the joining assemblies to provide attachment of the clinch nuts to the AHSS sheet at different locations.

In another practice of the method, the joining assembly and the nut ram are operated between a floor and an upper beam of a framework mounted on the floor. This practice of the method is disclosed with the joining assembly operated below the AHSS sheet and the nut ram operated above the AHSS sheet. This practice of the method can also utilize a plurality of the joining assemblies mounted on the floor spaced from each other and a nut ram assembly mounts a plurality of the nut rams and under the operation of the controller cooperates with the controller to simultaneously provide attaching of clinch nuts to the AHSS sheet at different locations.

In a further practice of the method, one end of a C frame supports the joining assembly and another end of the C frame supports the nut ram that cooperates with the clinch die under the operation of the controller to provide the attachment of a clinch nut to the AHSS sheet, and a robot moves the C frame under operation of the controller to provide the attaching of clinch nuts to the AHSS sheet at different locations.

A further object of the invention is to provide an assembly comprising a sheet of AHSS and a pierce clinch nut having a threaded hole that is attached to the AHSS sheet at a hole pierced thereby through the AHSS sheet with attachment provided by a clinch interlock so that the threaded hole is capable of receiving a threaded fastener for attaching another component to the AHSS sheet.

The objects, features and advantages of the present invention are readily apparent from the following detailed description of the preferred embodiments when taken in connection with the referenced drawings.

DETAILED DESCRIPTION

As required, detailed embodiments and latest mode of the present invention are disclosed herein; however, it is to be understood that the disclosed embodiments and modes of operation are merely exemplary of the invention that may be embodied in various and alternative forms and modes. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
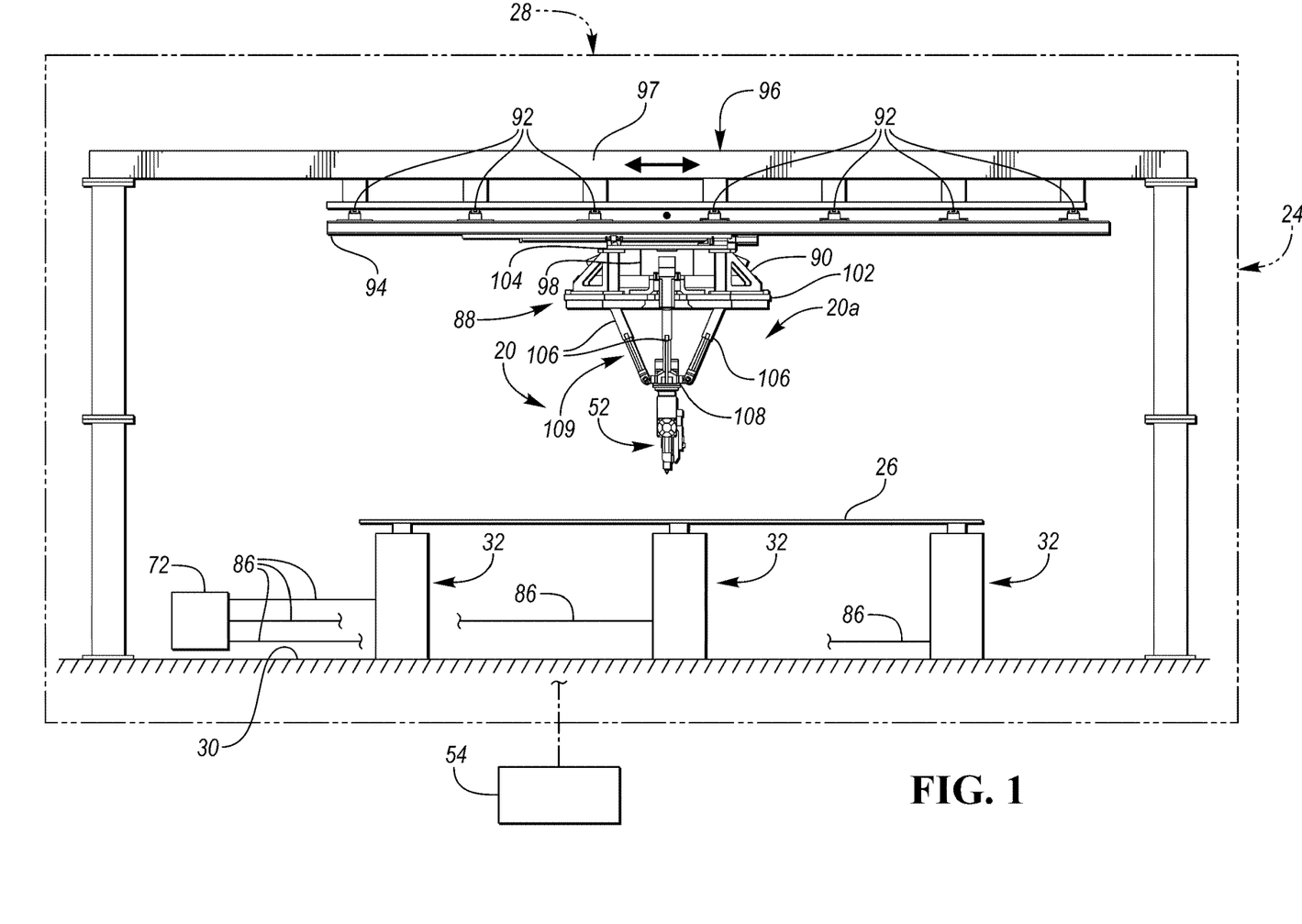
FIG. 1 is a somewhat schematic elevation view of one embodiment of apparatus constructed according to the invention to perform a method thereof for attaching clinch nuts to a sheet of AHSS.
Figure 2:
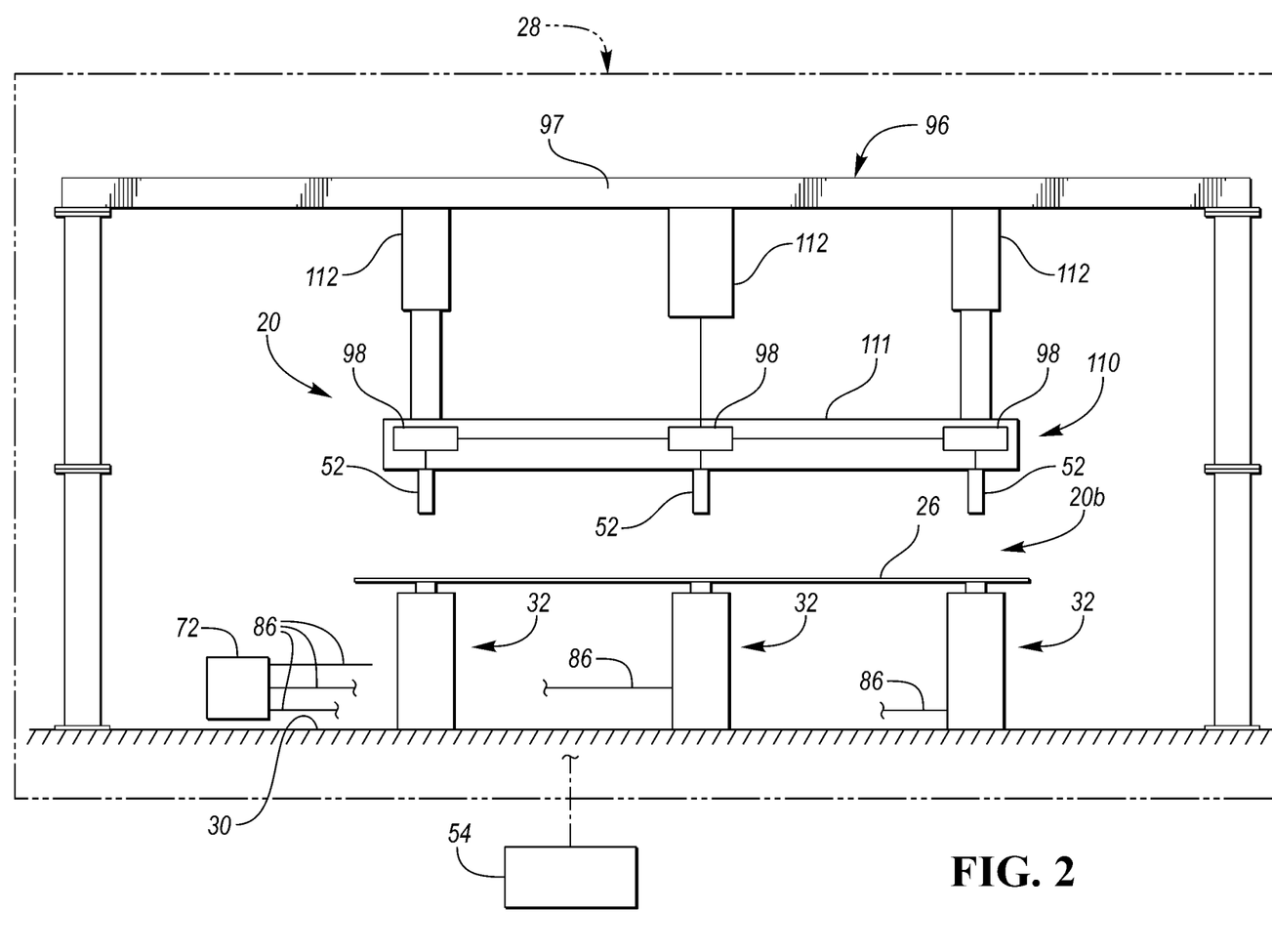
FIG. 2 is a somewhat schematic elevation view of another embodiment of apparatus constructed according to the invention to perform the method thereof for attaching clinch nuts to an AHSS sheet.
Figure 3:
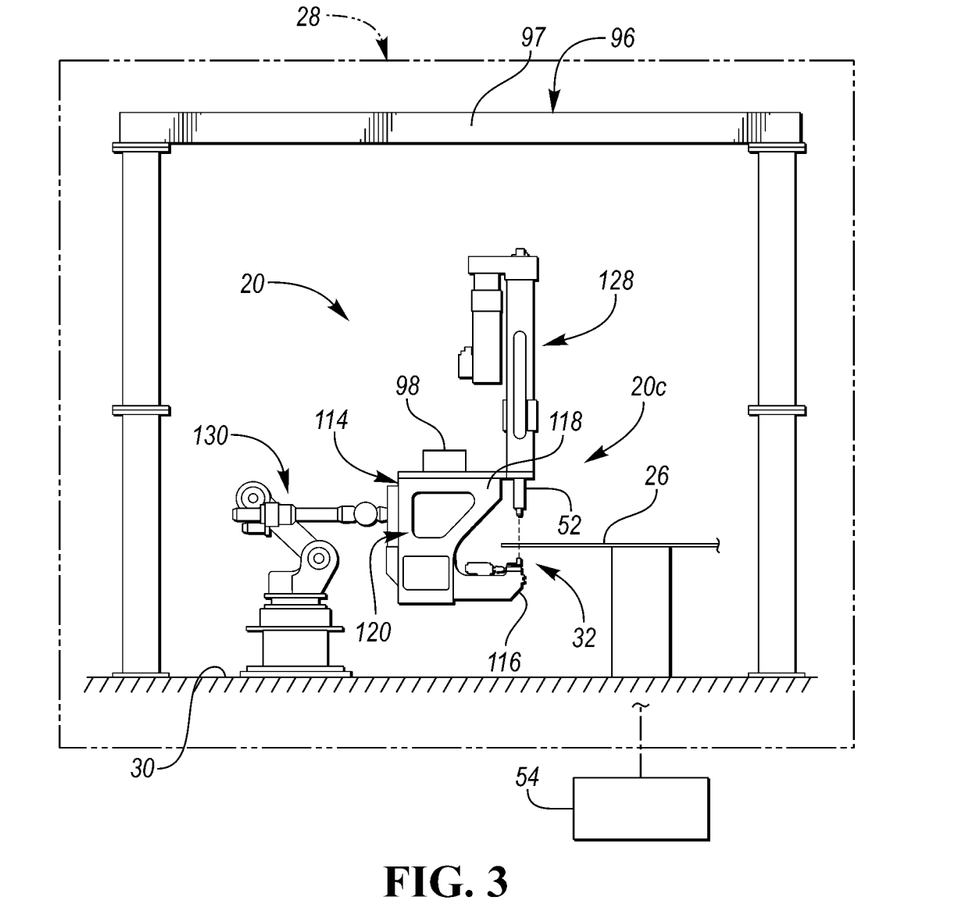
FIG. 3 is a somewhat schematic elevation view of a further embodiment of apparatus constructed according to the invention to perform the method thereof for attaching clinch nuts to an AHSS sheet.
Figure 4:
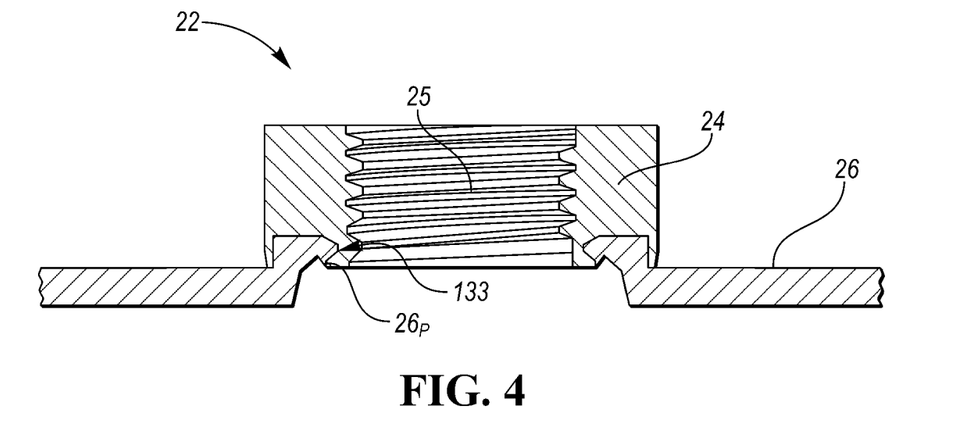
FIG. 4 is a sectional view through an assembly of a pierce clinch nut connected to an AHSS sheet in accordance with the invention.

With reference to FIGS. 1, 2 and 3, three different embodiments of apparatus 20 constructed in accordance with the present invention are illustrated for providing a method of the invention for providing an assembly 22 of a pierce clinch nut 24, having an extended pierce form 132 and a threaded hole 25 therethrough and is secured by a clinch interlock as is hereinafter described to a sheet of AHSS 26 as shown in FIG. 4. Both the apparatus and method of the invention will be described in an integrated manner to facilitate an understanding of different aspects of the invention. Also, the AHSS sheet 26 has a tensile strength of at least 700 mega Pascal or higher. Such, AHSS has particular utility for use in vehicle body-in-white assembly of structural components such as pillars and roof headers. This enables these vehicle structural components to have a relatively thin gauge and thus lightweight construction that enhances vehicle energy efficiency and provides improved occupant safety. Because of the extreme hardness and lack of elongation, i.e. approx. below 9 percent, AHSS sheets are generally not workable using conventional mechanical joining methods.

The embodiments of the apparatus 20 shown in FIGS. 1-3 are each disclosed as being within a light-safe work station 28 that can be controlled so no operation of laser heating that is involved can be performed unless human access thereof it prevented. However, the work stations 28 can be configured so human access thereto during the operation can be permitted as it is hereinafter more fully described. The embodiments of the apparatus 20 respectively shown in FIGS. 1, 2 and 3 are each mounted on a horizontal support 30 such as a "floor", a "factory floor", a "pedestal" or a "floor pedestal" all of which will be covered in connection with reference numeral 30 for purposes of this application. The different embodiments of the apparatus 20 respectively shown in FIGS. 1, 2 and 3 are more specifically identified as 20a, 20b and 20c and may be operated singularly or in combination that will be discussed in providing the assembly 22 show in FIG. 4 with one or more clinch nuts 24 secured to the AHSS sheet 26 so as to facilitate connection of another component to the AHSS sheet by use of a threaded fastener such as a threaded bolt, threaded stud or the like received by its threaded hole 25.

Each of the work stations 28 shown in FIGS. 1-3 includes at least one joining assembly 32, a plurality of which joining assemblies are part of the embodiments 20a and 20b of FIGS. 1 and 2, and only a single joining assembly with the embodiment of apparatus 20c shown in FIG. 3. Each of the embodiments of the apparatus includes a base 34 and an indexing member 36 mounted on the base for movement parallel to the AHSS sheet 26. The indexing member moves between a heating position where a heating opening 38 is located and a joining position where a clinch die 40 is spaced from each other along a direction parallel to the AHSS sheet 26. An actuator 42 moves the indexing member 36 between the heating position shown in FIGS. 5, 7 and 9 where its heating opening 38 is aligned with a work location 44 of the AHSS sheet 26 and a joining position shown in FIGS. 6, 8 and 10 where a clinch die 40 located within the indexing member is aligned with the work location 44.

Figure 5:
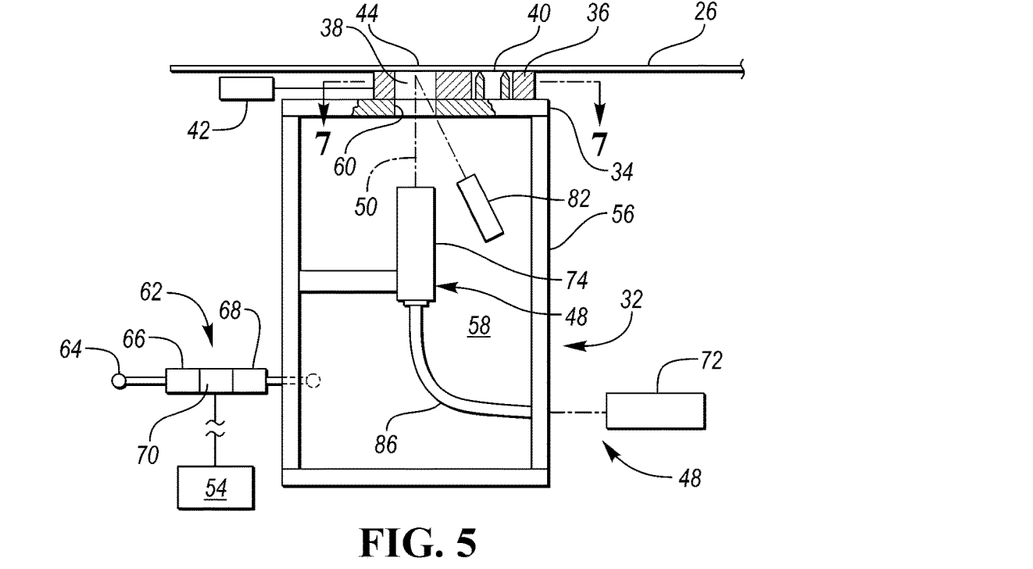
FIG. 5 is a somewhat sectional view taken through a joining assembly of one embodiment of the apparatus that includes a laser assembly for firing a laser beam through a heating opening of an indexing member in a heating position thereof to provide heating of a work location of an AHSS sheet.
Figure 6:
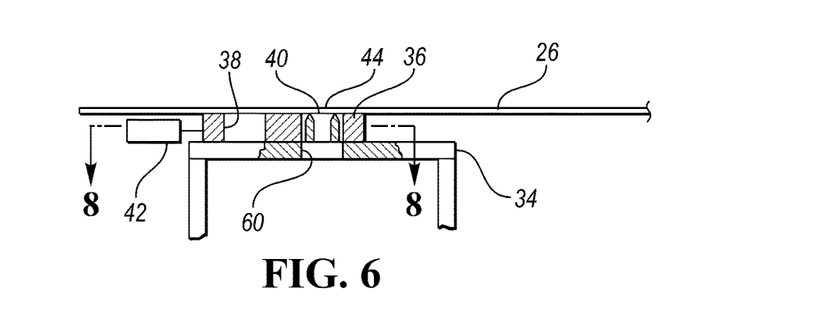
FIG. 6 is a partial view similar to FIG. 5 after the indexing member has been moved by an actuator from the heating position to a joining position where a clinch die is located.
Figure 17:
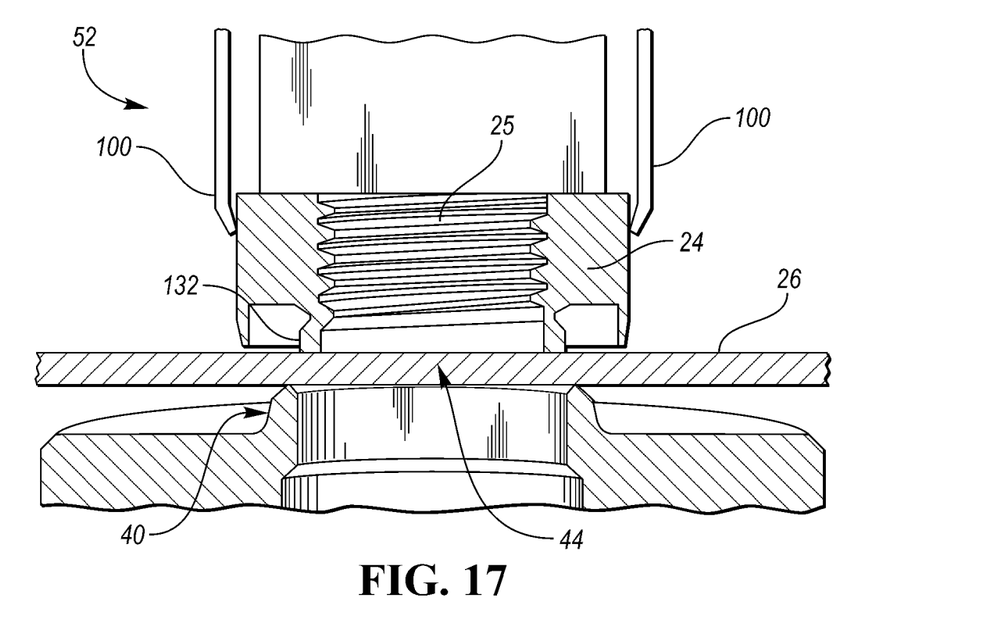
FIG. 17 is a sectional perspective view of the nut ram supporting a clinch nut in preparation for piercing and clinching to the AHSS sheet in cooperation with the clinch die of the indexing member.
Figure 18:
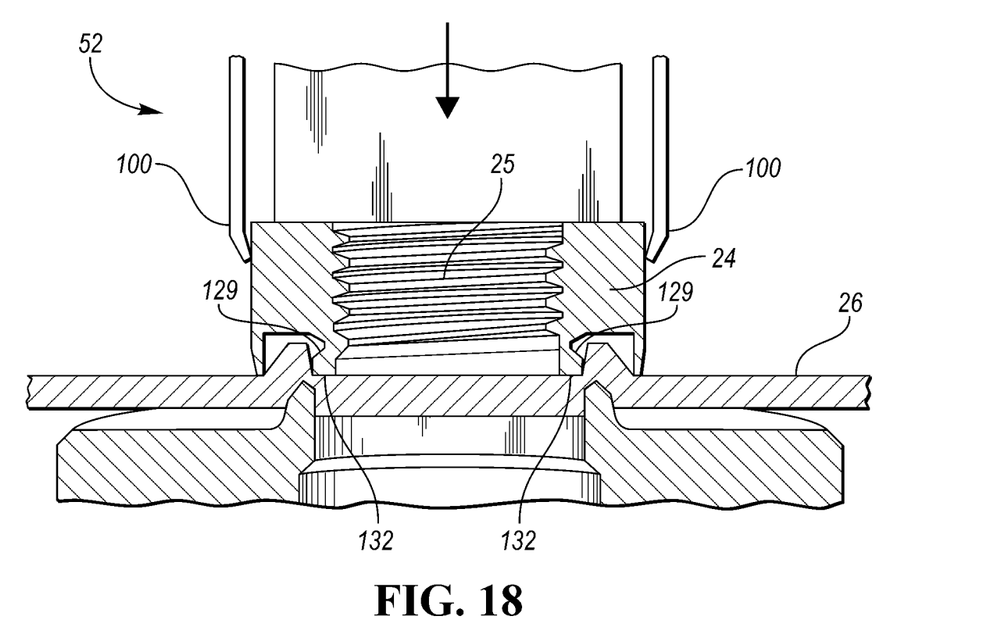
FIG. 18 is a perspective view similar to FIG. 17 at a further stage of the piercing and clinching operation.
Figure 19:
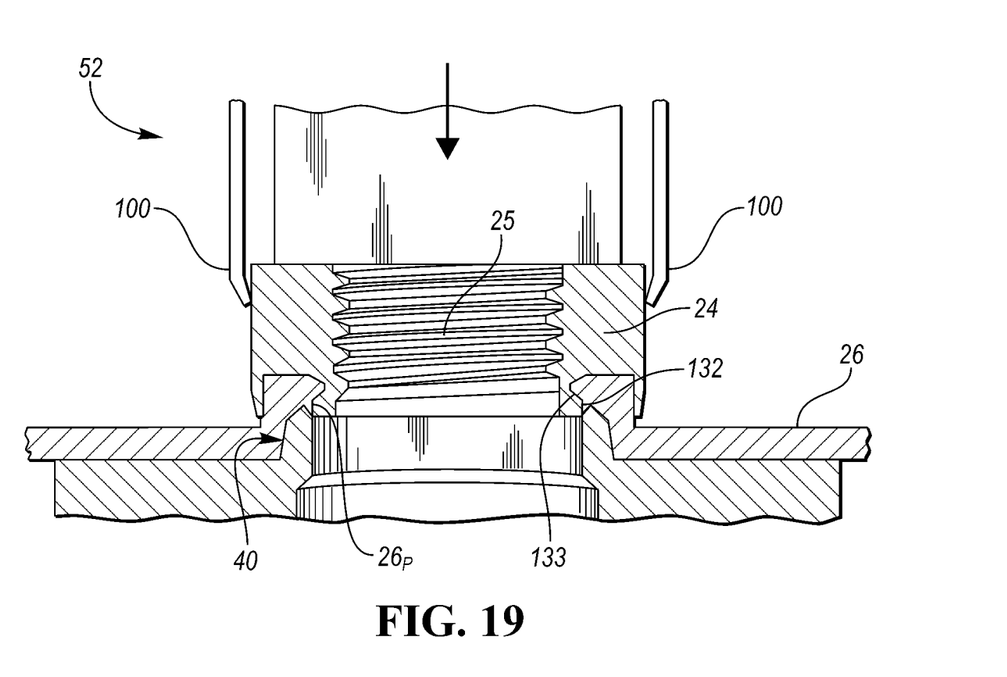
FIG. 19 is a perspective view similar to FIG. 18 after the piercing and clinching is completed.

A laser assembly 48 of each embodiment fires a laser beam 50 as illustrated in FIG. 5 through the heating opening 38 of the indexing member 36 while in the heating position to provide heating of the AHSS sheet 26. Such heating makes the heated work location 44 of the AHSS sheet 26 more ductile to permit the piercing of the hole and attachment of the clinch nut to the AHSS sheet. Each embodiment of the apparatus 20 includes a nut ram 52 to which the pierce clinch nuts 24 are cyclically fed and which cooperates with the clinch die 40 by movement toward each other to attach each clinch nut to the AHSS sheet 26 thereby clinching it to the heated work location 44 of the AHSS sheet as shown in FIGS. 17-19 so that a threaded fastener as previously discussed can be connected to the AHSS sheet.

Each embodiment of the apparatus 20 shown in FIGS. 1-3 includes a controller 54 that operates the joining assembly 32 and the nut ram 52 and any other necessary components of the apparatus to provide the attachment of clinch nuts 24 to the AHSS sheet 26 as the assembly 22 shown in FIG. 4.

Figure 13:
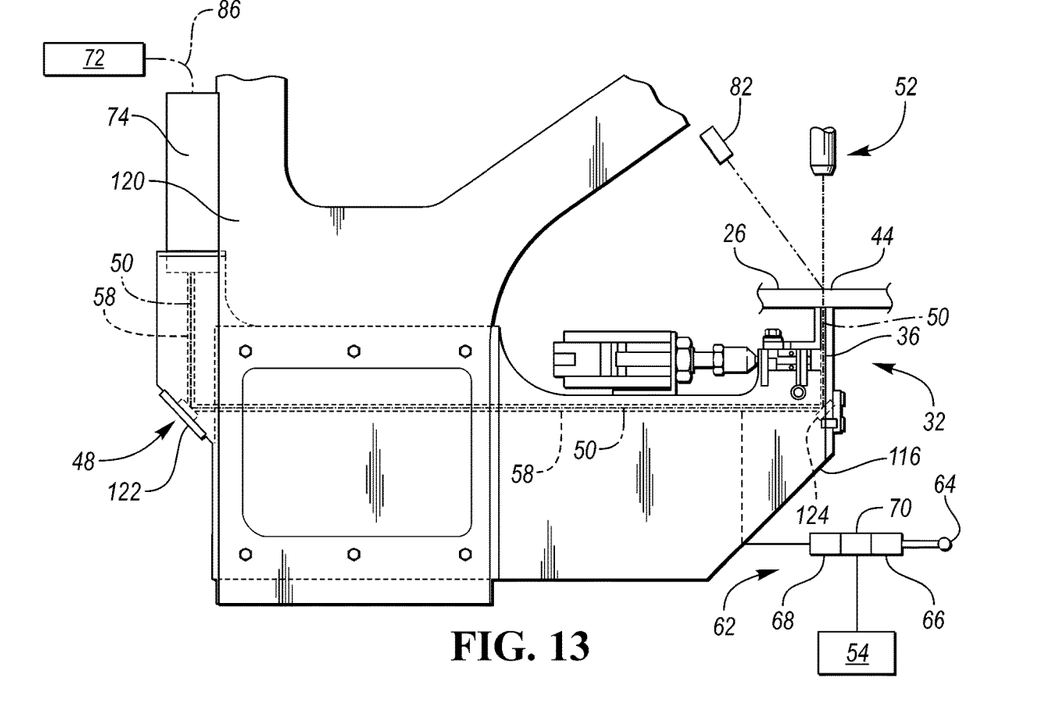
FIG. 13 is an enlarged view of a portion of the apparatus shown in FIG. 11 to illustrate its joining assembly.
Figure 14:
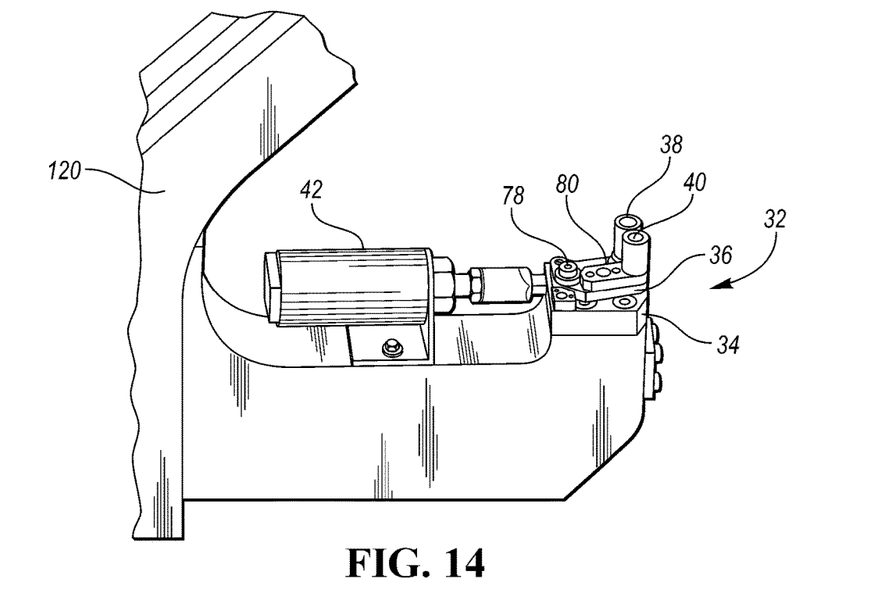
FIG. 14 is a perspective view of the joining assembly shown in FIG. 13.

As best illustrated in FIG. 5 and shown to some extent in FIG. 13, each embodiment of the disclosed apparatus is provided with its joining assembly 32 including an enclosure 56 defining a light-safe chamber 58 partially defined by the base 34. The laser assembly 48 fires the laser beam 50 through an opening 60 in the base 34 as well as through the heating opening 38 in the indexing member 36 while the indexing member 36 is in the heating position to provide the heating of the work location 44 of the AHSS sheet 26. The mounting of AHSS sheet to the index member 36 on the base 34 as shown in FIG. 5 is light-safe to prevent excessive radiation emissions from escaping from the light-safe chamber. Further, a detector assembly 62 is operated by the controller 54 to only permit operation of the laser assembly 48 when the AHSS sheet 26 is in light-safe contact with the indexing member 36 around its heating opening 38. As such, operators can then have safe access to the work station 28 for any necessary operational, repair or maintenance function, even when the apparatus is performing the clinch nut attachment as described, without any operator being subjected to any harmful scattered radiation from the laser beam.

As best illustrated in FIG. 5, each of the embodiments of the joining assembly 32 has its detection assembly 62 including a source 64 for providing pressurized gas to the light-safe chamber 58 of the joining assembly as well as including sensors 66 and 68 between which a detector 70 is located to detect a predetermined gas movement between the sensors which is indicative of a lack of light-safe contact with the indexing member around its heating opening 38 with the AHSS sheet 26 in order to provide a signal to the controller 54 that prevents the laser assembly 48 from the laser beam 50 when the laser is activated. The laser is supplied from a laser generator 72 to a collimator 74 that fires the laser beam 50 through the base opening 60 and the heating opening 38 of the indexing member to the work location 44 of the AHSS sheet 26 as previously described.

The clinch nuts attached by the apparatus and method are disclosed as pierce clinch nuts 24 that pierce through and form an interlock connection with the AHSS sheet 26 as is hereinafter more fully described, with the laser heating providing the AHSS sheet 26 with sufficient ductility to permit the piercing of the hole and attachment of the clinch nut.

Figure 7:
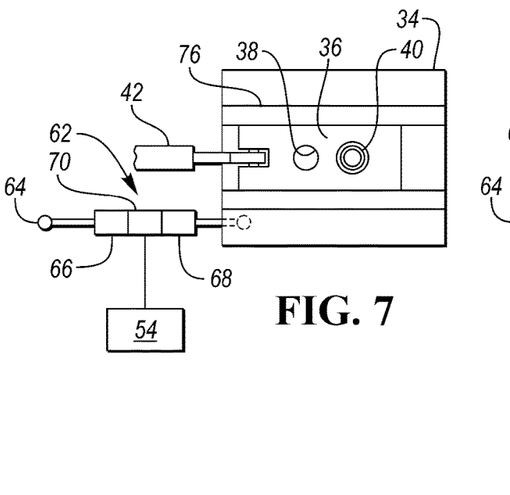
FIGS. 7 and 8 are top plan views that are respectively taken along the directions of lines 7-7 and 8-8 in FIGS. 5 and 6 to show the indexing member moved in a rectilinear manner between its heating and joining positions by operation of the actuator and movement of the indexing member.
Figure 8:
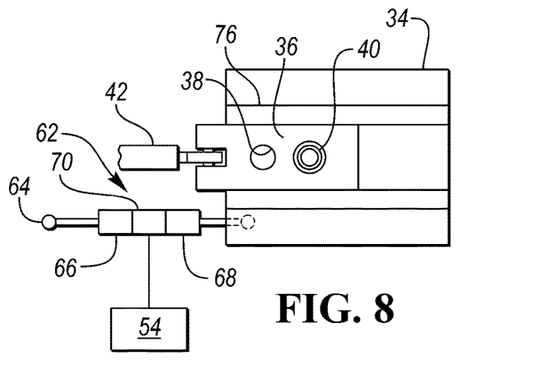

As illustrated in FIGS. 7 and 8, the joining assembly 32 includes a slideway 76 that supports the indexing member 36 on the base 34 for rectilinear movement, in a light-safe manner as discussed above, between its heating position shown in FIG. 7 and its joining position shown in FIG. 8 under the operation of the actuator 42 which may be of any suitable type such as an air cylinder or a solenoid directly connected or through a linkage to the indexing member.

Figure 9:
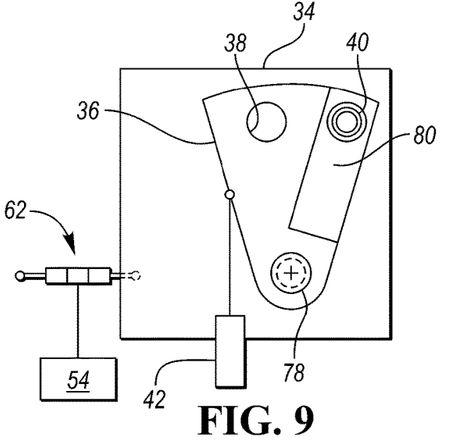
FIGS. 9 and 10 are plan views of another embodiment similar to FIGS. 7 and 8 but having an indexing member that is pivotally moved between its heating and joining positions by its schematically indicated actuator.
Figure 10:
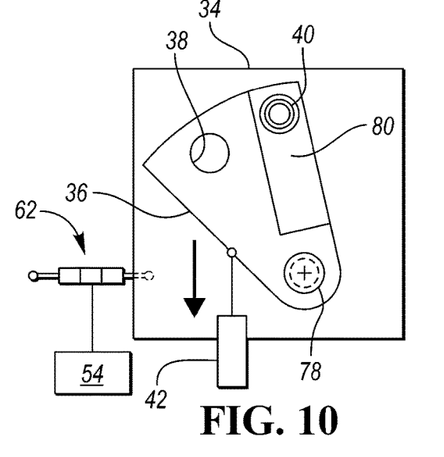

It is also possible as shown in FIGS. 9 and 10 for the joining assembly 32 to have its indexing member 36 supported on the base 34 by a pivotal connection 78 for pivotal movement, in a light-safe manner as discussed above, between its heating position of FIG. 9 and its joining position of FIG. 10. Furthermore, as also shown in FIGS. 9 and 10, the indexing member may include a die insert 80 that allows the clinch die 40 to be replaced due to wear or for switching the types of clinch nut utilized for the construction of the clinch dies needed for the production of jobs being performed.

As also shown in FIG. 5, the joining assembly includes a temperature sensor 82 for sensing the temperature of the work location 44 of the AHSS sheet 26 from either top or bottom side of the AHSS sheet through the heating opening 38 of the indexing member 36. This temperature sensing may be used to determine the extent of heating for performing any production job being executed. As shown in the embodiment of FIG. 13 whose structure and operation is described later, it is also possible for the temperature sensor 82 to sense the temperature of work location 44 from above on its side that faces away from the indexing member of the joining assembly 32. With either embodiment, it is also possible for the sensed temperature to control the extent of laser heating by operation of the controller 54 if such control is warranted.

With reference to FIG. 1, the embodiment of apparatus 20a includes a plurality of the joining assemblies 32 mounted on the horizontal support 30 provided by the factory floor. Laser heating provided by the apparatus 20a heats the AHSS sheet 26 to provide the mechanical joining of the clinch nut to the AHSS sheet as is hereinafter more fully described. The laser generator 72 through a beam splitter feeding fiber optic cables 86 feeds the laser to the laser collimators (identified as 74 in FIG. 5) to selectively provide heating at a plurality of work locations respectively aligned with the plurality of joining assemblies 32.

Figure 15:
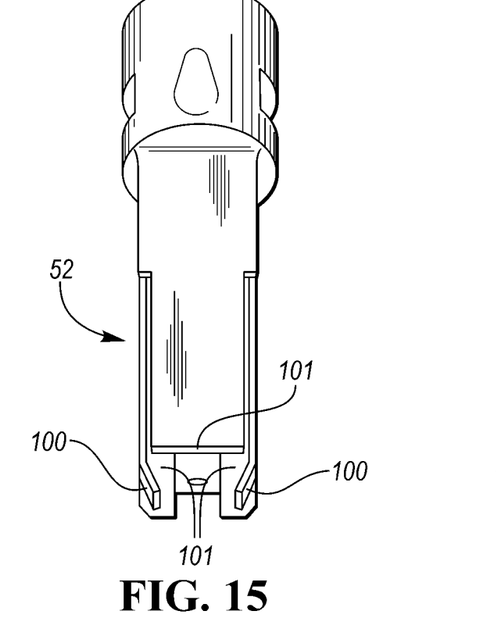
FIG. 15 is a perspective view of the nut ram of the apparatus shown without a pierce clinch nut.
Figure 16:
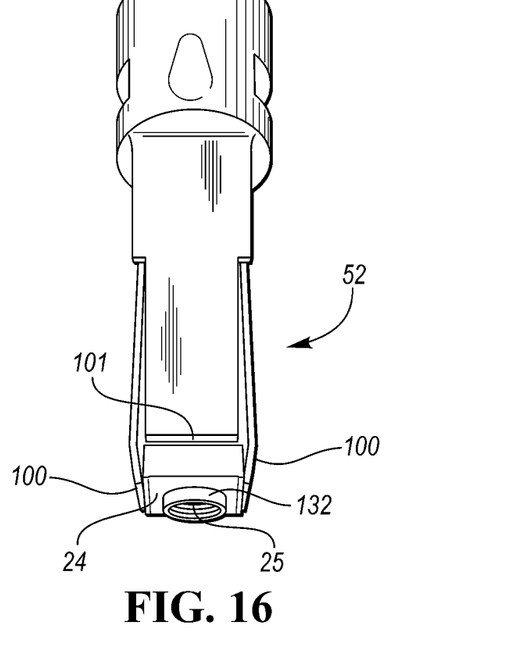
FIG. 16 is a perspective view of the nut ram of the apparatus and is shown supporting a pierce clinch nut.

Apparatus 20a shown in FIG. 1 also includes a parallel kinematic machine (referred to as a PKM) 88 that is mounted by a schematically illustrated carriage supported riser 90 on horizontal rails 92 and 94 that extend in perpendicular directions to each other on a framework 96 that is itself supported on the factory floor 30 and has an upper beam 97 on which the support is provided. The PKM 88 supports the nut ram 52 that cooperates with the clinch die 40 (FIGS. 17-19) of the joining assembly 32 to provide the joining by piercing a hole and clinching the clinch nut to the AHSS sheet, and the nut ram 52 is movable in horizontal directions perpendicular to each other along the rails 92 and 94 to different work locations while the operation of struts of the PKM by extension and retraction moves the nut ram 52 provides the clinch nut attachments. Furthermore, the nut ram 52 cyclically feeds pierce clinch nuts 24 for the joining operation. A feeder 98 shown on the riser 90 cyclically feeds the pierce clinch nuts 24 to the nut ram 52 and may be of any conventional type such as the feeders disclosed by the U.S. Pat. No. 7,100,260 of Mark A. Savoy et al. entitled PROGRAMMABLE APPARATUS AND METHOD FOR VEHICLE BODY PANEL AND CLINCH NUT ATTACHMENT or by the U.S. Pat. No. 7,398,896 of Phillip J. I. Morgan entitled VEHICLE BODY SHEET METAL CLINCH NUT FEEDER, the entire disclosures of these two patents are hereby incorporated by reference. This pierce clinch nut feeding is shown in FIGS. 15 and 16 held between spring fingers 100 and against a positioning stop 101 of the nut ram 52.

With continuing reference to FIG. 1, the riser 90 of PKM 88 connects a first support 102 thereof to the carriage 104 that is supported for movement in perpendicular directions by the perpendicular rails 92 and 94 to a selected position under operation of the controller 54. Extendable and retractable struts 106 of the PKM 88 project from the first support 102 to a second support 108 to provide a tripod 110 arrangement with the second support mounting the nut ram 52 for rotation and angular positioning that permits the operation at any required orientation in cooperation with the joining assembly 32 as previously described. The struts 106 may be extendable and retractable in any suitable manner such as disclosed by United States patent application Publication No. 2016/0263641, published on Sep. 15, 2016 by Mark A. Savoy et al. under the title WORK STATION AND METHOD FOR JOINING METALLIC SHEETS, the entire disclosure of which is hereby incorporated by reference. More specifically, the struts 106 may each be embodied by a roller screw having: an upper end pivotally connected to the first support 102 of the PKM and a lower end pivotally connected to the second support 108, an elongated screw, a nut including a planet carrier and a plurality of threaded rollers rotatable on the planet carrier and meshed with the screw such that relative rotation between the screw and the nut changes the length of the strut as disclosed in the referenced application.

With reference to FIG. 2, the embodiment of the apparatus 20b includes at least one joining assembly 32 mounted on the factory floor 30. With a single joining assembly 32, the AHSS sheet 26 is positionally indexed to provide clinch nut connection at different locations. It is also possible for this embodiment like the embodiment of FIG. 1 to have a plurality of the joining assemblies 32 mounted on the factory floor 30 and fed by the laser generator 72 through the cables 86. These joining assemblies 32 are operated by the controller 54 in cooperation with a nut ram assembly 110 including a platen 111 that supports one or a plurality of the nut rams 52, each of which that has a nut feeder 98. The platen 111 is movable vertically by one or a plurality of operators 112 supported on framework 96 at its upper beam 97 for vertical to provide the piercing and clinching for attachment of the clinch nuts as shown in FIGS. 17-19. When there is a single joining assembly 32 this embodiment will perform one clinch nut piercing at a time with a single nut ram 52. The AHSS sheet 26 can then be horizontally indexed as needed to perform the pierce clinch nut connection at other locations. Furthermore, when there are a plurality of the joining assemblies 32, this embodiment can sequentially pierce a hole and clinch the clinch nut 24 to the AHSS sheet 26 at each joining assembly. Also, each nut ram 52 of this embodiment can be angularly operated on platen 111 as needed by cams to control their angularity of operation relative to the vertical movement provided by the operator 112.

Figure 11:
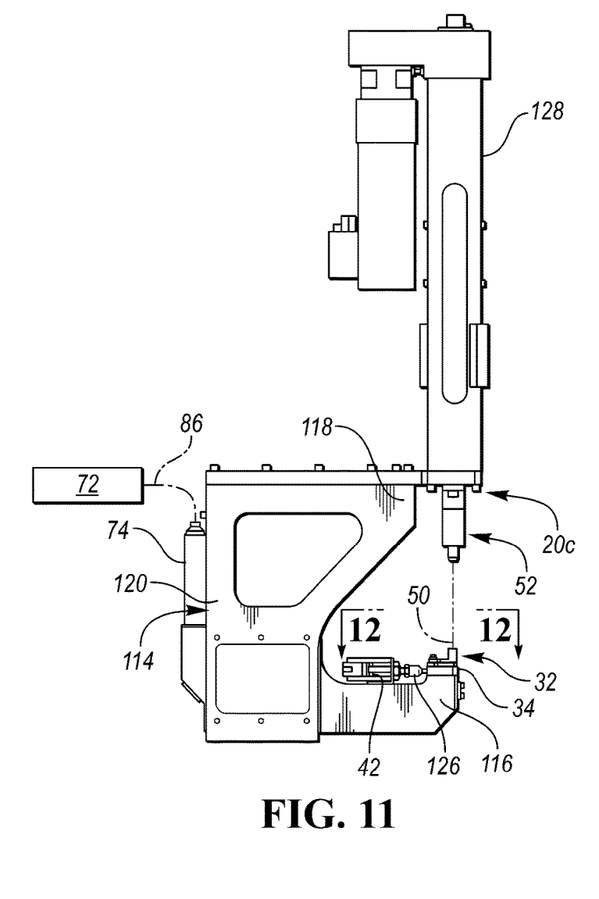
FIG. 11 is an enlarged but partial view of the apparatus embodiment shown in FIG. 3.
Figure 12:
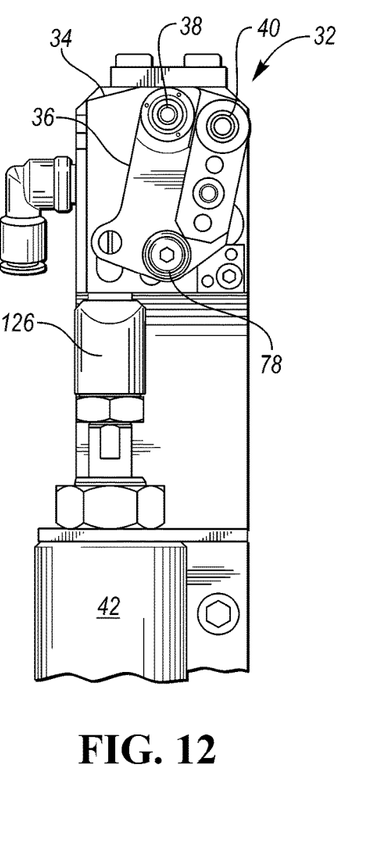
FIG. 12 is a plan view taken along the direction of line 12-12 in FIG. 11 and showing the indexing member in its heating position corresponding with the schematic view of FIG. 9.

With reference to FIGS. 3 and 11, the apparatus 20c includes a C frame 114 having one end 116 supporting the joining assembly 32 where in a laser beam is provided to heat the AHSS sheet 26, and the C frame 114 has another end 118 that supports the nut ram 52. More specifically, a housing 120 of the C frame 114 supports the laser collimator 74 and, as shown best in FIG. 13, has its laser beam 50 projecting downwardly from the collimator toward a first mirror 122 within the light-safe chamber 58 defined by the housing. That first mirror 122 reflects the laser beam 50 at a 90 degree angle horizontally toward a second mirror 124 for reflection 90 degrees upwardly toward the indexing member 36 which functions generally the same as the previously described embodiment of FIGS. 9 and 10 by pivoting between its heating position and its joining position. Extension and retraction of the piston connecting rod 126 of actuator 42 in this embodiment pivots the indexing member 36 about pivotal connection 78 to move between the heating position and the joining position.

With further reference to FIG. 11, the apparatus 22c includes a roller screw 128 that moves the nut ram 52 vertically, and a robot 130 shown in FIG. 3 supports and moves the C frame 114 to and from different locations.

The pierce clinching operation of each embodiment begins as shown in FIG. 17 with clinch die 40 located in the indexing member 36 while the indexing member is in the joining position shown in FIG. 7. While in this position, the chamber 58 remains light-safe since the clinch die 40 mounted in the indexing member 36 is covering the opening 60. The indexing member then moves to the heating position so that the AHSS sheet can be heated by the laser beam. Actuation of the nut ram 52 as shown in FIG. 17 brings the piercing form 132 of the clinch nut 24 into contact with the heated AHSS sheet 26. Continuing downward motion of the nut ram 52 moves pierce form 132 into the AHSS sheet to create a pierced hole as shown in FIG. 18. The pierced slug is discarded through an opening in the clinch die 40. Simultaneous with the creation of the hole in the AHSS sheet, as the nut ram 52 continues downward the heated AHSS sheet 26 area surrounding the opening of the clinch die 40 starts to flow into an undercut 129 of the clinch nut 24 as shown in FIG. 18. As the nut ram 52 reaches the end of its downward movement the AHSS sheet 26 continues to flow into the undercut so as to create an interlock 133 and completely fill the area of the undercut 129 and securely attach the clinch nut 24 to the AHSS sheet 26 as shown in FIGS. 4 and 19. Thereafter the ram 52 is moved upward to its start position where after the cycle repeats itself.

It is to be understood that the piercing form 132 may be of a configuration i.e. round, square, oblong or contoured.

During vehicle body assembly for which this invention has particular utility, the sheet 26 of AHSS to which the clinch nut 24 is attached will normally have a thickness of 0.7 to 2 millimeters and will be heated to an approximate temperature of 500° to 825° C. The heating time depends on the thickness but will normally be about 0.5 to 1.5 seconds and the indexing time will be about 0.1 to 0.3 of a second, the time to perform the attachment of the clinch will be about 1.2 to 2.2 seconds and the laser will be of any type of laser that is able to accomplish these functions as stated.

Further, even if operators are located within station 28 as shown in FIGS. 1-3, the operation will be light-safe due to the containment of scattered radiation from the laser beam as described. Furthermore, the laser utilized may be a fiber laser or a diode laser. Also, during the laser heating and mechanical joining, any suitable but not shown clamping or the like may be used to position the AHSS sheet 26 for the operation.

Figure 20:
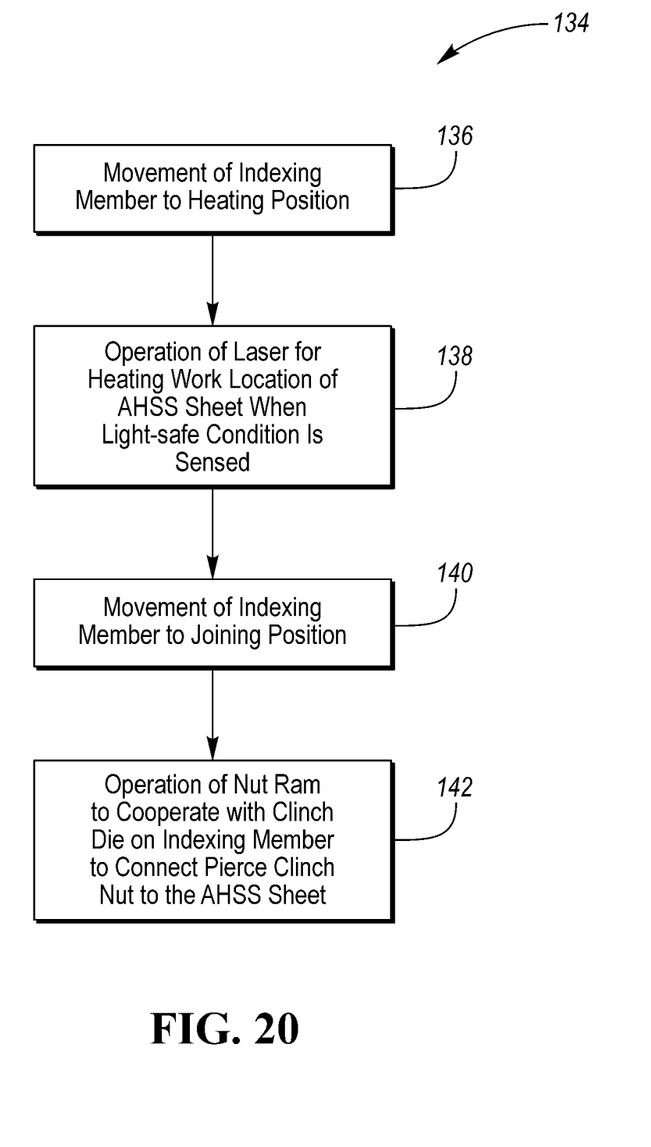
FIG. 20 is a flow chart illustrating the method of operation performed using the controller of the apparatus.

The controller 54 shown and described above in connection with FIGS. 1-3 is configured to provide the operation shown by the flow chart 134 of FIG. 20. As described above, this operation begins by step 136 as the indexing member is moved to the heating position and continues with step 138 as the laser provides the light-safe heating of the work location of the AHSS sheet. The following movement of the indexing member to the joining position as shown by step 140 is then followed by the nut ram and die operation of step 142 to connect the clinch nut to the sheet of AHSS.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system for securing a clinch nut to a sheet of advanced high strength steel (AHSS) comprising:
the clinch nut;
the sheet of AHSS;
a joining assembly adjacent to where the AHSS sheet is positioned;
the joining assembly including a base and a clinch die;
a heat assembly to provide heating of a work location of the AHSS sheet to make the work location more ductile to permit piercing and interlocking of the work location of the AHSS sheet;
a nut ram to which the clinch nut and a plurality of clinch nuts, each of which has a threaded hole, are fed, to pierce a hole through the heated work location of the AHSS sheet and attach the clinch nut to the AHSS sheet with a clinch interlock at the heated work location of the AHSS sheet whereby the heated work location of the AHSS sheet flows into an undercut of the clinch nut, so a threaded fastener can be connected to the AHSS sheet; and
a controller configured to operate the joining assembly and the nut ram.

2. The system in claim 1 wherein the heat assembly further comprises a laser assembly to fire a laser beam to provide heating of the work location; and
wherein the joining assembly includes an enclosure defining a chamber containing laser beam radiation partially defined by the base and from which the laser assembly fires the laser beam through an opening in the base to provide the heating of the work location of the AHSS sheet, and a detector assembly operated by the controller to only permit operation of the laser assembly when the AHSS sheet is in contact containing laser beam radiation.

3. The system in claim 2 wherein the detector assembly includes a source of pressurized gas for providing pressurized gas to the chamber and also includes a detector for detecting gas flow from the source through the chamber to detect whether the AHSS sheet is in contact that contains laser beam radiation.

4. The system in claim 1 wherein the clinch nut further comprises a pierce clinch nut that is fed to the nut ram for attaching to the AHSS sheet.

5. The system in claim 1 further including a temperature sensor for sensing the temperature of the AHSS sheet at the work location of the AHSS sheet.

6. The system in claim 1 which includes a plurality of the joining assemblies spaced from each other and operated by the controller; and a parallel kinematic machine (PKM) operated by the controller and including: a first support; a tripod having three extendable and retractable struts mounted and extending away from the first support in a converging manner toward each other; a second support mounted by the three struts spaced from the first support to mount the nut ram that aligns with the clinch die under the operation of the controller to provide the attachment of clinch nuts to the AHSS sheet; and perpendicular rails that mount the PKM for movement in horizontal directions that are perpendicular to each other to cooperate with the joining assemblies to provide attachments of clinch nuts to the sheet at different locations.

7. The system in claim 1 which includes a floor and a framework having an upper beam spaced above the floor, and the joining assembly and the nut ram being located and operated between the floor and upper beam of the framework.

8. The system in claim 7 wherein the joining assembly is supported on the floor below the AHSS sheet and the nut ram is supported by the upper beam of the framework above the AHSS sheet.

9. The system in claim 7 which includes a plurality of the joining assemblies mounted on the floor spaced from each other and operated by the controller; and a nut ram assembly that mounts a plurality of the nut rams under the operation of the controller to cooperate with the joining assemblies to simultaneously provide attachments of clinch nuts to the AHSS sheet at different locations.

10. The system in claim 1 which includes a C frame having one end that supports the joining assembly and having another end that supports the nut ram that cooperates with the clinch die under the operation of the controller to provide the attachments of the clinch nuts to the AHSS sheet, and a robot that moves the C frame under operation of the controller to provide attachments of the clinch nuts to the AHSS sheet at different locations.

11. The system of claim 1 wherein the clinch die includes an opening to discard a pierced slug from the pierced hole through the opening.

12. The system of claim 1 wherein the joining assembly further comprises an indexing member mounted on the base for movement parallel to the AHSS sheet; and the indexing member having a heating opening and the clinch die spaced from each other along a direction parallel to the AHSS sheet;
wherein the system further comprises an actuator that moves the indexing member between a heating position where its heating opening is located at the work location of the AHSS sheet and a joining position where its clinch die is located at the work location of the AHSS sheet;
wherein the heat assembly comprises a laser assembly fires a laser beam through the heating opening of the indexing member while in the heating position;
wherein the nut ram is aligned with the clinch die when the indexing member is in the joining position; and
wherein the actuator moves the indexing member between the heating position and the joining position in 0.3 seconds or less to interlock the heated work location of the AHSS sheet to the clinch nut.

13. The system in claim 12 which includes either: a slideway that mounts the indexing member on the base for rectilinear movement by the actuator between the heating position and the joining position or a pivotal connection that mounts the indexing member on the base for pivotal movement by the actuator between the heating position and the joining position.

14. The system of claim 12 wherein the joining assembly includes an enclosure defining a chamber containing laser beam radiation partially defined by the base and from which the laser assembly fires the laser beam through an opening in the base and thence through the heating opening in the indexing member while in the heating position to provide the heating of the work location of the AHSS sheet, and a detector assembly operated by the controller to only permit operation of the laser assembly when the AHSS sheet is in contact with the indexing member, thereby containing laser beam radiation with the AHSS sheet and the indexing member around its heating opening when the indexing member is in the heating position.

15. The system of claim 14 wherein the detector assembly includes a source of pressurized gas for providing pressurized gas to the chamber and also includes a detector for detecting gas flow from the source through the chamber to detect whether the AHSS sheet is in contact with the indexing member, that contains laser beam radiation with the AHSS sheet and the indexing member around its heating opening.

16. The system of claim 1 further comprising a frame supporting the joining assembly, the nut ram, and the heat assembly.

17. A system to secure a clinch nut to a sheet of advanced high strength steel (AHSS) comprising:
the clinch nut;
the sheet of AHSS;
a joining assembly adjacent to where the AHSS sheet is positioned;
the joining assembly including a base and an indexing member mounted on the base for movement parallel to the AHSS sheet; and the indexing member having a heating opening and a clinch die spaced from each other along a direction parallel to the AHSS sheet;
an actuator that moves the indexing member between a heating position where its heating opening is located at a work location of the AHSS sheet and a joining position where its clinch die is located at the work location of the AHSS sheet;
a laser assembly to fire a laser beam through the heating opening of the indexing member while in the heating position to provide heating of the work location of the AHSS sheet;
a nut ram to which the clinch nut and a plurality of clinch nuts, each of which has a threaded hole, are fed, and the nut ram being aligned with the clinch die when the indexing member is in the joining position to pierce a hole through the heated work location of the AHSS sheet and attach the clinch nut to the AHSS sheet at the heated work location of the AHSS sheet whereby the heated work location of the AHSS sheet flows into an undercut of the clinch nut, so a threaded fastener can be connected to the AHSS sheet;
a controller configured to operate the joining assembly and the nut ram;

a slideway that mounts the indexing member on the base for rectilinear movement by the actuator between the heating position and the joining position or a pivotal connection that mounts the indexing member on the base for pivotal movement by the actuator between the heating position and the joining position;

wherein the actuator moves the indexing member between the heating position and the joining position in 0.3 seconds or less;

wherein the joining assembly comprises:

an enclosure defining a chamber containing laser beam radiation partially defined by the base and from which the laser assembly fires the laser beam through an opening in the base and thence through the heating opening in the indexing member while in the heating position to provide the heating of the work location of the AHSS sheet, and a detector assembly operated by the controller to only permit operation of the laser assembly when the AHSS sheet is in contact containing laser beam radiation with the indexing member around its heating opening when the indexing member is in the heating position;

wherein the detector assembly comprises a source of pressurized gas to provide pressurized gas to the chamber and also includes a detector to detect gas flow from the source through the chamber to detect whether the AHSS sheet is in contact that contains laser beam radiation with the indexing member around its heating opening;

a temperature sensor to sense the temperature of the AHSS sheet at the work location of the AHSS sheet;

a C frame having one end that supports the joining assembly and having another end that supports the nut ram that cooperates with the clinch die under the operation of the controller to provide the attachments of the clinch nuts to the AHSS sheet; and a robot that moves the C frame under operation of the controller to provide attachments of the clinch nuts to the AHSS sheet at different locations.

18. The system of claim 17 wherein the clinch die includes an opening to discard a pierced slug from the pierced hole through the opening.

19. A system to secure a sheet of advanced high strength steel (AHSS) comprising:

the clinch nut;

the sheet of AHSS;

a forming assembly adjacent to where the AHSS sheet is positioned, the forming assembly comprising:

a base, an indexing member mounted on the base for movement parallel to the AHSS sheet, wherein the indexing member has a heating opening, and a die spaced from the indexing member along a direction parallel to the AHSS sheet;

an actuator that moves the indexing member between a heating position where its heating opening is located at a work location of the AHSS sheet and a forming position where its die is located at the work location of the AHSS sheet;

a heating assembly to provide heating of the work location of the AHSS sheet;

a ram aligned with the die when the indexing member is in the forming position to pierce a hole through the AHSS sheet to attach the clinch nut to the AHSS sheet at the heated work location of the AHSS sheet whereby the heated work location of the AHSS sheet flows into an undercut of the clinch nut;

a controller configured to operate the forming assembly and the ram;

a slideway that mounts the indexing member on the base for rectilinear movement by the actuator between the heating position and the forming position or a pivotal connection that mounts the indexing member on the base for pivotal movement by the actuator between the heating position and the forming position;

wherein the actuator moves the indexing member between the heating position and the forming position in 0.3 seconds or less;

a temperature sensor to sense the temperature of the AHSS sheet at the work location of the AHSS sheet;

a C frame having one end that supports the forming assembly and having another end that supports the ram that cooperates with the die under the operation of the controller; and a robot that moves the C frame under operation of the controller to provide forming of the AHSS sheet at different locations.

20. The system of claim 19 wherein the die includes an opening to discard a pierced slug from the pierced hole through the opening.

\* \* \* \* \*